(12) United States Patent
Yokonuma

(10) Patent No.: US 7,489,343 B2
(45) Date of Patent: Feb. 10, 2009

(54) ELECTRONIC CAMERA

(75) Inventor: Norikazu Yokonuma, Adachi-ku (JP)

(73) Assignee: Nikon Corporation, Tokyo (JP)

( * ) Notice: Subject to any disclaimer, the term of this patent is extended or adjusted under 35 U.S.C. 154(b) by 324 days.

(21) Appl. No.: 10/515,379

(22) PCT Filed: May 27, 2003

(86) PCT No.: PCT/JP03/06603

§ 371 (c)(1),
(2), (4) Date: Nov. 23, 2004

(87) PCT Pub. No.: WO03/101092

PCT Pub. Date: Dec. 4, 2003

(65) Prior Publication Data

US 2005/0243179 A1    Nov. 3, 2005

(30) Foreign Application Priority Data

May 28, 2002    (JP)    ............................ 2002-154006

(51) Int. Cl.
H04N 5/225    (2006.01)
(52) U.S. Cl. .................................................. 348/220.1
(58) Field of Classification Search .............. 348/220.1, 348/248
See application file for complete search history.

(56) References Cited

U.S. PATENT DOCUMENTS 4,541,016 A * 9/1985 Ochi et al. ................ 348/230.1
5,185,669 A * 2/1993 Kato ........................ 348/223.1
5,828,407 A   10/1998 Suzuki
6,473,523 B1 * 10/2002 Newman et al. ............ 382/176
7,129,980 B1 * 10/2006 Ashida .................. 348/333.04
2001/0040626 A1 * 11/2001 Ohta et al. .................. 348/220
2002/0191847 A1 * 12/2002 Newman et al. ............ 382/176
2004/0130648 A1   7/2004 Kikuchi et al.

FOREIGN PATENT DOCUMENTS

| JP | A 10-136244 | 5/1998 |
| JP | A 2001-69409 | 3/2001 |
| JP | A 2002-262186 | 9/2002 |
| WO | WO 02/10825 A1 | 2/2002 |

OTHER PUBLICATIONS

Pentax Optio 330 Camera Operating Manual Published date Jun. 1, 2001 pp. 19, 38.*

* cited by examiner

Primary Examiner—James M Hannett
(74) Attorney, Agent, or Firm—Oliff & Berridge, PLC

(57) ABSTRACT

An electronic camera includes a release section which, by receiving user operation, is switched from a standby mode to a preparation mode and instructs an image pickup section to prepare for shooting, and is switched from the preparation mode to a shooting mode and instructs the image pickup section to start shooting. A shooting mode controlling section sets the image pickup section to an appropriate mode for moving image photographing when the release section is in the standby mode, and sets the image pickup section to an appropriate mode for still image photographing when the release section is in the preparation mode and before the release section is switched to the shooting mode. Accordingly, since the image pickup section has already been set to the appropriate mode for still image photographing when the user operates the release section to start shooting, the release time lag can be shortened.

4 Claims, 2 Drawing Sheets

ELECTRONIC CAMERA

CROSS-REFERENCE TO RELATED APPLICATIONS

This application is based upon and claims the benefit of priority from Japanese Patent Application No. 2002-154006, filed on May 28, 2002, the entire contents of which are incorporated herein by reference.

TECHNICAL FIELD

The present invention relates to an electronic camera that photographs an object to generate image data and records the generated image data in a recording medium. The present invention also relates to an electric camera having a function of displaying an object as a moving image.

BACKGROUND ART

Conventional electronic cameras are known in which the light from an object is converted into electrical signals by an image sensor including a CCD (charge coupled device) and the electrical signals are converted into digital data to be recorded into a recording medium such as a flash memory and the like. Generally, the electronic camera has a color LCD (liquid crystal display) on its rear part. An object to be photographed is displayed on the color LCD as a moving image as follows.

First, the image sensor accumulates the light energy, which is received from an object, as charges. The accumulated charges are read out as electrical signals at a predetermined time interval. On the read-out electrical signals, processing including A/D conversion processing and color processing is performed, and the processed signals are stored into a work memory such as a DRAM as image data.

At the same time, the image data is also output to a displaying section, and an imaging process is performed on the image data by a video encoder. The color LCD generates the image of an object from the image data on which the imaging process has been performed and displays it as a moving image. The color LCD is then used as a viewfinder to determine a photo composition.

The image sensor includes a large number of photoelectric conversion elements and charge transfer electrodes both formed on a semiconductor substrate. As such a type of image sensor, an image sensor is known in which a moving-image photographing mode and a still-image photographing mode can be switched each other.

In the moving-image photographing mode, the blooming (a leakage of charges between adjacent photoelectric conversion elements or from photoelectric conversion elements to charge transfer electrodes) is reduced by adjusting voltage differences within the image sensor.

In the still-image photographing mode, the occurrence of the blooming is not prevented. Therefore, the still-image photographing mode is not generally suited to taking a moving picture.

In conventional electronic cameras, it is required for the release time lag (time required from when a release button is fully pressed until a shutter actually operates) to be shortened as much as possible. This is because, when a moving object is photographed, for example, it is easier for the person who takes a photo to decide a timing of full-pressing the release button as the release time lag is made shorter, which leads to making continuous shooting a snap. Contrarily, longer release time lag may cause difficulty releasing the shutter at the right moment and stress on the person who takes a photo.

DISCLOSURE OF INVENTION

An object of the present invention is to reduce the release time lag in an electronic camera having a function of displaying an object as a moving image.

Hereinafter, contents of claims of the invention will be described on an item-by-item basis.

(1) An electronic camera of the invention includes an image pickup section, a displaying section, a release section, and a shooting mode controlling section.

The image pickup section converts light received from an object through a lens into an electrical signal to generate image data.

The displaying section displays the image data generated by the image pickup section.

The release section is set to any of a standby mode, a preparation mode, and a shooting mode. When the release section is in the standby mode, the user operation initiates the release section to switch to the preparation mode and instruct the image pickup section to prepare for shooting. When the release section is in the preparation mode, the user operation initiates the release section to switch to the shooting mode and instruct the image pickup section to start shooting.

The shooting mode controlling section sets the image pickup section to an appropriate mode for moving-image photographing when the release section is in the standby mode. When the release section is switched to the preparation mode, the shooting mode controlling section sets the image pickup section to an appropriate mode for still-image photographing before the release section is switched to the shooting mode.

Therefore, when the user operates the release section to start shooting, the image pickup section has already been set to the appropriate mode for still-image photographing. Accordingly, it is not necessary for the modes of the image pickup section to be changed, immediately before the image pickup section starts shooting. As a result, the release time lag can be reduced in comparison with that of the conventional electronic camera.

(2) The electronic camera of the invention may preferably have the following features.

First, the release section has a release button.

Second, when the release button is half-pressed, it switches the release section to the preparation mode; when the release button is fully pressed, it switches the release section to the shooting mode; and after the press has been released, it switches the release section to the standby mode.

(3) The electronic camera of the invention may preferably have the following features.

First, the image pickup section includes an image sensor having a plurality of photoelectric conversion elements and a plurality of charge transfer electrodes.

Second, in the appropriate mode for moving-image photographing, the blooming is prevented by a control of electric potential differences within the image sensor.

Third, in the appropriate mode for still-image photographing, the control of electric potential differences is not performed.

(4) The electronic camera of the invention may preferably have the following feature. That is, the procedure that "the image of an object is displayed on the displaying section as a moving image until the release section is switched to the shooting mode" is performed.

In this case, the effect that "the user can select a photo composition on the basis of the image of an object displayed on the displaying section as a moving image until the user operates the release section to issue a command to start shooting" is expected.

(5) More preferably, in the above item (4), the electronic camera of the invention may have the following feature. That is, the procedure that "when the release section is switched to the preparation mode, the shooting mode controlling section sets the image pickup section to the appropriate mode for still-image photographing after the image pickup section adjusts an aperture of the lens in accordance with an amount of the light received from the object" is performed.

Generally, when the release section is in the standby mode, the aperture is left open in many cases. Therefore, a case is assumed in which, after the release section is switched to the preparation mode, an amount of the light received by the image pickup section is reduced by adjusting the aperture. In such a case, the effect that "while moving-image photographing is performed in the still-image photographing mode and a moving image is displayed on the displaying section, the occurrence of the blooming can be prevented" is expected.

The nature, principle, and utility of the invention will become more apparent from the following detailed description when read in conjunction with the accompanying drawings.

BEST MODE FOR CARRYING OUT THE INVENTION

Embodiments of the invention will now be described with reference to the drawings.

<Structure of the Embodiment>

Figure 1:
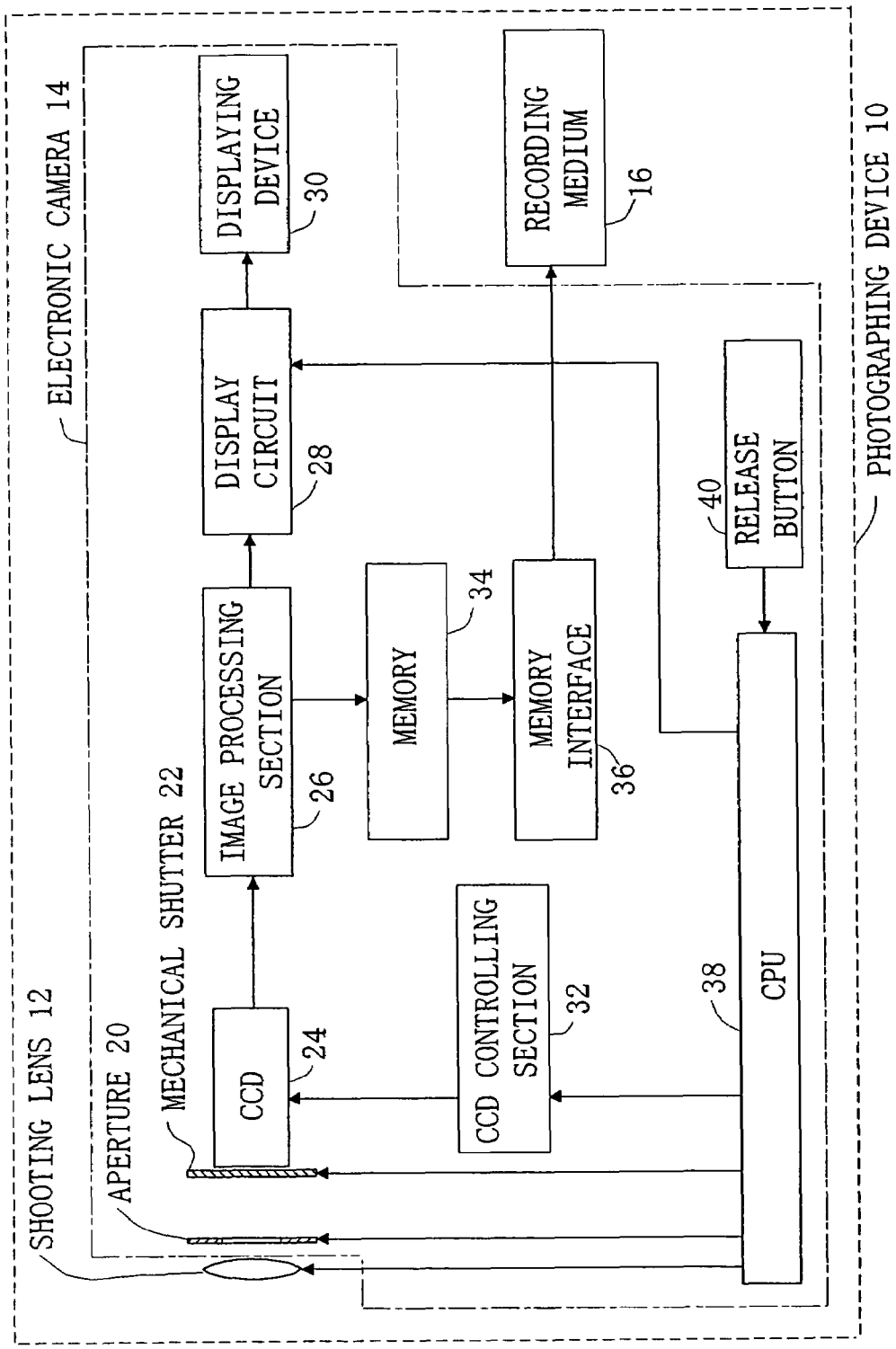
FIG. 1 is a block diagram showing a photographing device and electronic camera of the present embodiment.

FIG. 1 is a block diagram showing the structure of a photographing device according to the present embodiment. The photographing device 10 is configured by connecting a recording medium 16 to an electronic camera 14 of the invention to which a shooting lens 12 is fixed. The electronic camera 14 includes an aperture 20, a mechanical shutter 22, a CCD 24 (image sensor), an image processing section 26, a display circuit 28, a displaying device 30, a CCD controlling section 32, a memory 34, a memory interface 36, a CPU 38, and a release button 40.

The CCD 24 includes a large number of photoelectric conversion elements and a large number of charge transfer electrodes both formed on a semiconductor substrate (not shown). The CCD 24 has a substrate voltage controlling terminal (not shown) that can make a switch between a moving-image photographing mode and a still-image photographing mode.

<Correspondence of the Embodiment to Claims>

Correspondence of the invention to claims will be described below. The following correspondence is an exemplary interpretation, so the invention is not limited to this relationship.

An image pickup section described in the claims corresponds to the aperture 20, the mechanical shutter 22, the CCD 24, and the image processing section 26.

A displaying section described in the claims corresponds to the display circuit 28 and the displaying device 30.

A release section described in the claims includes only the release button 40.

A shooting mode controlling section described in the claims corresponds to the CCD controlling section 32 and the CPU 38.

<Description of the Shooting Operation>

Figure 2:
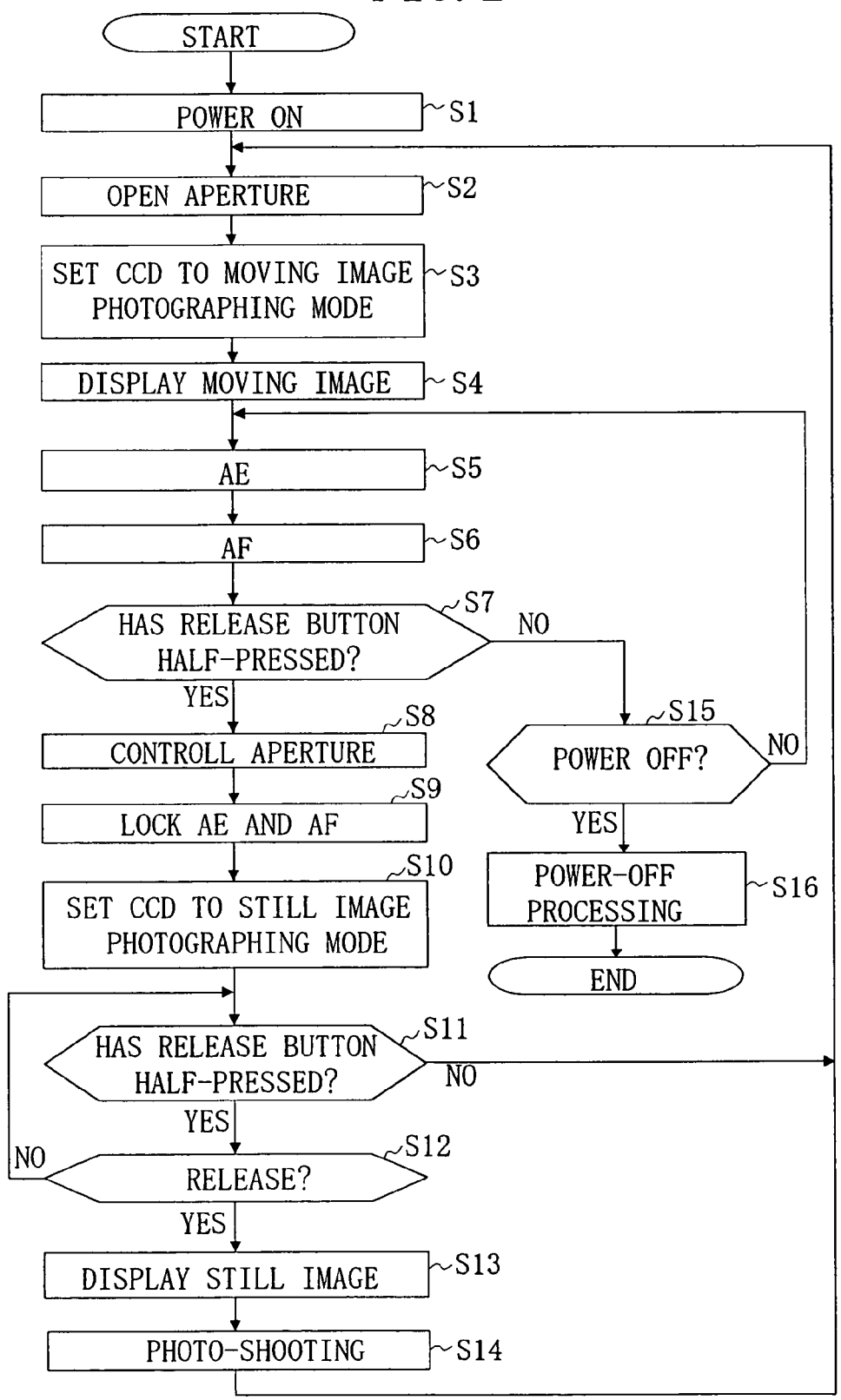
FIG. 2 is a flowchart showing the operation of the photographing device according to the embodiment.

FIG. 2 is a flowchart showing the shooting operation of the photographing device 10 of the present embodiment. The shooting operation will be described below in order of the step numbers shown in FIG. 2.

[Step S1]

When the power supply button (not shown) of the electronic camera 14 is turned on, power-on processing is performed.

[Step S2]

The CPU 38 opens the aperture of the shooting lens 12 by the aperture 20. At this moment, the release button 40 is not yet depressed, but is set to the standby mode.

[Step S3]

According to an instruction from the CPU 38, the CCD controlling section 32 supplies the substrate voltage controlling terminal of the CCD 24 with a voltage for preventing the blooming (corresponding to a control of electric potential difference described in claims) and sets the CCD 24 to the moving-image photographing mode.

The control of electric potential difference makes, for example, the electric potential differences between the photoelectric conversion elements and semiconductor substrate smaller. In this case, when the charges accumulated in a photoelectric conversion element reach a certain amount, charges are ejected from the photoelectric conversion element to the semiconductor substrate, thereby preventing the leakage of charges between adjacent photoelectric conversion elements.

The moving-image photographing mode corresponds to an appropriate mode for moving-image photographing described in the claims.

[Step S4]

The CCD 24 accumulates the light energy, which is received from an object (not shown) through the shooting lens 12, as charges. The image processing section 26 (continuously) reads out the charges, which are accumulated by the CCD 24, at predetermined intervals (charge accumulation time) as electrical signals to convert into digital data.

The image processing section 26 performs color processing on the digital data to output to the display circuit 28 and the memory 34 as image data.

The display circuit 28 performs an imaging process on the image data for output.

The displaying device 30 displays the image data, which is continuously output from the display circuit 28, as a moving image.

The time interval (charge accumulation time) during which the image processing section 26 reads out the charges from the CCD 24 is controlled by the CPU 38 and the CCD controlling section 32.

[Step S5]

The CPU 38 sets the shutter speed of the mechanical shutter 22 and the aperture of the shooting lens 12 (F-value) for shooting according to the brightness of an object and the distance between the shooting lens 12 and the object (auto exposure (AE)).

[Step S6]

The CPU 38 adjusts the position of the shooting lens 12, i.e., the distance between the shooting lens 12 and CCD 24, according the distance between an object and the shooting lens 12 (auto focus (AF)).

[Step S7]

When the release button 40 is half-pressed by the user, it is switched to the preparation mode and issues through the CPU 38 and the CCD controlling section 32 a command to prepare shooting. After that, the process proceeds to step S8. The shooting preparation here corresponds to the operations in steps S8 to S10.

If the release button 40 is not pressed, the process proceeds to step S15.

[Step S8]

The CPU 38 narrows the aperture of the shooting lens 12 by the aperture 20 according to the F-value set in step S5. That is, an amount of the light from an object through the shooting lens 12 and incident on the CCD 24 is physically adjusted and fixed by the aperture 20.

[Step S9]

The CPU 38 fixes the position of the shooting lens 12 and the shutter speed of the mechanical shutter 22 for shooting.

[Step S10]

According to an instruction from the CPU 38, the CCD controlling section 32 changes a voltage supplied to the substrate voltage controlling terminal of the CCD 24 and sets the CCD 24 to the still-image photographing mode.

This voltage change is performed, for example, so as to increase the voltage difference between the photoelectric conversion elements and the semiconductor substrate. In this case, since an amount of the charges that the photoelectric conversion elements can accumulate becomes larger, the dynamic range also becomes wider.

The still-image photographing mode corresponds to an appropriate mode for still-image photographing described in the claims.

[Step S11]

When the release button 40 is kept half-pressed, the process proceeds to step S12. When the release button 40 is released by the user, the process returns to step S2.

[Step S12]

When the release button 40 is fully pressed by the user, it issues through the CPU 38 a command to start shooting and the process proceeds to step S13. When the release button 40 is still kept half-pressed, the process returns to step S11.

[Step S13]

The CPU 38 instructs the display circuit 28 and the displaying device 30 to switch the display of the image of an object from a moving image to still image display.

[Step S14]

The CPU 38 makes the mechanical shutter 22 operate with the shutter speed fixed in step S9. While the mechanical shutter 22 is open, charges are accumulated in the CCD 24.

The image processing section 26 reads out the charges as electrical signals. The image processing section 26 converts the read out electrical signals into digital data and then performs color processing on the digital data to output to the memory 34 as image data.

The image data stored in the memory 34 is recorded through the memory interface 36 into the recording medium 16 (end of shooting), and the process returns to step S2.

[Step S15]

When the power supply button is kept in the on state, the process returns to step S5. When the power supply button is turned off, the process proceeds to step S16.

[Step S16]

Power off processing is performed.

<Different Points from the Conventional Electronic Camera and Effects of the Embodiment>

In the conventional operation mechanism, after the release button is fully pressed, the operation to switch the image sensor to the still-image photographing mode (corresponding to step S10 in the present embodiment) is performed to start shooting. Generally, it takes time to change modes of an image sensor such as a CCD and the like, so that there has been a limit to reduction of the release time lag in the conventional operation mechanism.

Therefore, the shooting operation mechanism of the present embodiment is given as follows.

First, when the release button 40 is in the standby mode, the CPU 38 and the CCD controlling section 32 set the CCD 24 to the moving-image photographing mode. The release button 40 is switched to the preparation mode and issues a command to prepare shooting when being half-pressed in the standby mode. When the release button 40 is in the preparation mode, the CPU 38 and the CCD controlling section 32 set the CCD 24 to the still-image photographing mode. When the release button 40 is fully pressed during the preparation mode, it is switched to the shooting mode and issues a command to start shooting.

A difference from the conventional operation mechanism is that, after the release button 40 is half-pressed in step S7, the aperture of the shooting lens 12 is adjusted and then the CCD 24 is switched to the still-image photographing mode. Therefore, after the release button 40 is fully pressed by the user in step S12, shooting can be started without changing the modes of the CCD 24. As a result, the release time lag can be made shorter than in the conventional electronic camera.

The displaying device 30 displays the image of an object as a moving image until the release button 40 is fully pressed in step S12. Therefore, the user can select a photo composition on the basis of the image of an object displayed on the displaying device 30 as a moving image.

Further, after an amount of the light from an object through the shooting lens 12 and incident on the CCD 24 is physically reduced by the aperture 20 in step S8, the CCD 24 is switched to the still-image photographing mode. Therefore, while the CCD 24 captures a moving image in the still-image photographing mode (steps S10 to S12), the amount of the light received by the CCD 24 is small. Accordingly, while the CCD 24 captures a moving image in the still-image photographing mode, the occurrence of the blooming can be prevented.

<Supplemental Items of Embodiments>

In the present embodiment, an example has been described in which the CCD 24 is used as an image sensor. The invention, however, is not limited to this embodiment. CMOS and the like may be used as an image sensor.

In the embodiment, an example has been described in which the electronic camera 14, the shooting lens 12, and the recording medium 16 are separately formed. The invention, however, is not limited to this embodiment. The electronic camera 14 may include the shooting lens 12 or the recording medium 16.

The invention is not limited to the above embodiments and various modifications may be made without departing from the spirit and scope of the invention. Any improvement may be made in part or all of the components.

INDUSTRIAL APPLICABILITY

In the electronic camera of the invention, the shooting mode controlling section sets the image pickup section to an appropriate mode for still-image photographing when the release section is in the preparation mode. Therefore, when the user operates the release section to start shooting, the image pickup section has already been set to an appropriate mode for still-image photographing. Accordingly, it is not necessary to switch the modes of the image pickup section, immediately before the image pickup section starts shooting. As a result, the release time lag can be reduced comparing to that of the conventional camera.

What is claimed is:

1. An electronic camera comprising:
    an image pickup section converting light received from an object through a lens into an electrical signal to generate image data;
    a displaying section displaying the image data;
    a release section which has a standby mode, a preparation mode, and a shooting mode, the release section switching from the standby mode to the preparation mode and instructing the image pickup section to prepare for shooting when user operation is received, and the release section switching from the preparation mode to the shooting mode and instructing the image pickup section to start shooting when the user operation is received; and
    a shooting mode controlling section setting the image pickup section to an appropriate mode for moving-image photographing when the release section is in the standby mode, and when the release section is switched to the preparation mode, the shooting mode controlling section setting the image pickup section to an appropriate mode for still-image photographing before the release section is switched to the shooting mode, wherein
    the image pickup section includes an image sensor having a plurality of photoelectric conversion elements and a plurality of charge transfer electrodes;
    the appropriate mode for moving-image photographing is a mode in which blooming is substantially prevented by control of electric potential difference in the image sensor; and
    the appropriate mode for still-image photographing is a mode in which the control of electric potential difference is not performed.

2. The electronic camera according to claim 1, wherein the release section has a release button switching the release section to the preparation mode when the release button is half-pressed, switching the release section to the shooting mode when the release button is fully pressed, and switching the release section to the standby mode after the release button is released.

3. The electronic camera according to claim 1, wherein the image of an object is displayed on the displaying section as a moving image until the release section is switched to the shooting mode.

4. The electronic camera according to claim 3, wherein when the release section is switched to the preparation mode, the shooting mode controlling section sets the image pickup section to the appropriate mode for still-image photographing after the image pickup section adjusts an aperture of the lens in accordance with an amount of the light received from the object.

* * * * *